US010187857B2

(12) United States Patent
Khay-Ibbat et al.

(10) Patent No.: US 10,187,857 B2
(45) Date of Patent: Jan. 22, 2019

(54) SYSTEM AND METHOD FOR SELECTIVE PREVENTION OF TRANSMITTING A SCHEDULING REQUEST

(71) Applicant: APPLE INC., Cupertino, CA (US)

(72) Inventors: Samy Khay-Ibbat, San Francisco, CA (US); Navid Damji, San Jose, CA (US); Shivesh Makharia, San Jose, CA (US); Johnson Sebeni, Fremont, CA (US); Sreevalsan Vallath, Dublin, CA (US); Longda Xing, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/498,405

(22) Filed: Sep. 26, 2014

(65) Prior Publication Data

US 2015/0092643 A1 Apr. 2, 2015

Related U.S. Application Data

(60) Provisional application No. 61/883,858, filed on Sep. 27, 2013.

(51) Int. Cl.
H04W 52/22 (2009.01)
H04W 52/02 (2009.01)
(Continued)

(52) U.S. Cl.
CPC ....... *H04W 52/22* (2013.01); *H04W 52/0203* (2013.01); *H04W 52/0206* (2013.01);
(Continued)

(58) Field of Classification Search
None
See application file for complete search history.

(56) References Cited

U.S. PATENT DOCUMENTS 9,660,791 B2 5/2017 Kim et al.
2011/0243047 A1* 10/2011 Dayal .................. H04W 16/14
370/311
(Continued)

FOREIGN PATENT DOCUMENTS

CN 101779394 7/2010
WO 2009/099931 8/2009
WO 2011/038775 4/2011

*Primary Examiner* — Ayaz R Sheikh
*Assistant Examiner* — Mariela Vidal Carpio
(74) *Attorney, Agent, or Firm* — Fay Kaplun & Marcin, LLP

(57) ABSTRACT

A station that performs a method to coordinate transmissions of scheduling requests (SR) with OnDurations of a connected discontinuous reception (C-DRX) cycle. The station receives a packet at a packet arrival time relative to a schedule indicating the SR opportunities and onDurations, the SR opportunities occurring at a first interval, the onDurations occurring at a second interval, the first interval being less than the second interval. The station determines an SR opportunity subsequent to the packet arrival time that precedes an entirety of a subsequent onDuration, such that a transmission duration to transmit the SR and the packet maximally overlaps with the selected onDuration. A sleep mode of the processor of the station is used until a time associated with the selected SR opportunity. An active mode of the processor is used to transmit the SR and receive control channel information during the onDuration.

20 Claims, 5 Drawing Sheets

(51) Int. Cl.
*H04W 72/04* (2009.01)
*H04W 72/12* (2009.01)
*H04W 76/28* (2018.01)
*H04W 84/04* (2009.01)

(52) U.S. Cl.
CPC ..... *H04W 52/0216* (2013.01); *H04W 72/042* (2013.01); *H04W 72/1284* (2013.01); *H04W 76/28* (2018.02); *H04W 84/042* (2013.01); *Y02D 70/1262* (2018.01); *Y02D 70/23* (2018.01); *Y02D 70/24* (2018.01)

(56) References Cited

U.S. PATENT DOCUMENTS

| | | | |
|---|---|---|---|
| 2013/0021995 A1* | 1/2013 | Ehsan | H04W 72/1284 370/329 |
| 2013/0028243 A1* | 1/2013 | Wentink | H04L 1/0026 370/338 |
| 2013/0089067 A1* | 4/2013 | Ji | H04W 56/00 370/330 |
| 2013/0194994 A1* | 8/2013 | Dayal | H04W 76/048 370/311 |
| 2013/0315119 A1* | 11/2013 | Tabet | H04W 52/0216 370/311 |
| 2014/0056198 A1* | 2/2014 | Quan | H04W 52/0216 370/311 |
| 2015/0009815 A1* | 1/2015 | Hsu | H04W 28/0221 370/230.1 |

* cited by examiner

SYSTEM AND METHOD FOR SELECTIVE PREVENTION OF TRANSMITTING A SCHEDULING REQUEST

PRIORITY CLAIM/INCORPORATION BY REFERENCE

This application claims priority to U.S. Provisional Application 61/883,858 entitled "System and Method for Selective Prevention of Transmitting a Scheduling Request," filed on Sep. 27, 2013, the entirety of which is incorporated herein by reference.

BACKGROUND INFORMATION

A station may establish a wireless connection to a wireless communications network using a variety of different hardware and software. During the connection with the network, the station may be configured with a specification or schedule in which information may be received to determine wireless properties such as channel estimation, time tracking loop, frequency tracking loop, etc. Also while connected to the network, the station may execute an application in which data is transmitted. Prior to transmission, a scheduling request is transmitted along substantially similar means as the information related to the wireless properties.

SUMMARY

In one exemplary embodiment, a method is performed by a station. The method includes receiving a packet at a packet arrival time relative to a schedule indicating scheduling request (SR) opportunities and onDurations of a connected discontinuous reception (C-DRX) specification, the SR opportunities having a first interval of M ms therebetween, the onDurations having a second interval of N ms therebetween, the first interval M being less than the second interval N, the SR opportunities indicating when the station may transmit an SR to a connected network, the onDurations indicating when control channel information is to be received from the connected network. The method further includes determining a selected SR opportunity subsequent to the packet arrival time that precedes an entirety of a selected onDuration, the selected SR opportunity being selected such that a transmission duration to transmit the SR and the packet maximally overlaps with the selected onDuration, utilizing a sleep mode until a time associated with the selected SR opportunity as indicated by the schedule, the sleep mode being used to prevent at least one SR opportunity scheduled before the selected SR opportunity and between the packet arrival time and the selected onDuration to be used to transmit the SR and utilizing an active mode to transmit the SR and receive the control channel information.

In a further exemplary embodiment, a further method is performed by a station. The method includes receiving, at a first time, a packet to be transmitted by the station. The method further includes determining a schedule for the station, wherein the schedule includes first durations having a first interval duration between each adjacent first duration, the first durations indicating an opportunity to start a transmission process for transmitting packets to a network, wherein a processor of the station is placed in an active mode to start the transmission process, and second durations having a second interval duration between each adjacent second duration, the second durations indicating when a processor of the station is placed in the active mode to receive transmissions from the network and the second interval duration indicating when the processor of the station is placed in a sleep mode, the first interval duration being less than the second interval duration. The method also includes selecting one of the first durations to start the transmission process for transmitting the packet to the network, wherein the selected one of the first durations is not the first duration immediately following the first time, wherein the processor of the station remains in the sleep mode during the first duration immediately following the first time.

In another exemplary embodiment, a station includes a transceiver and a processor. The transceiver is configured to establish a connection to a network. The processor is coupled to a memory and is configured to receive, at a first time, a packet to be transmitted by the station and determine a schedule for the station, wherein the schedule includes first durations having a first interval duration between each adjacent first duration, the first durations indicating an opportunity to start a transmission process for transmitting packets to the network, wherein a processor of the station is placed in an active mode to start the transmission process, and second durations having a second interval duration between each adjacent second duration, the second durations indicating when a processor of the station is placed in the active mode to receive transmissions from the network and the second interval duration indicating when the processor of the station is placed in a sleep mode, the first interval duration being less than the second interval duration. The processor is further configured to select one of the first durations to start the transmission process for transmitting the packet to the network, wherein the selected one of the first durations is not the first duration immediately following the first time, wherein the processor of the station remains in the sleep mode during the first duration immediately following the first time.

DETAILED DESCRIPTION

Figure 1:
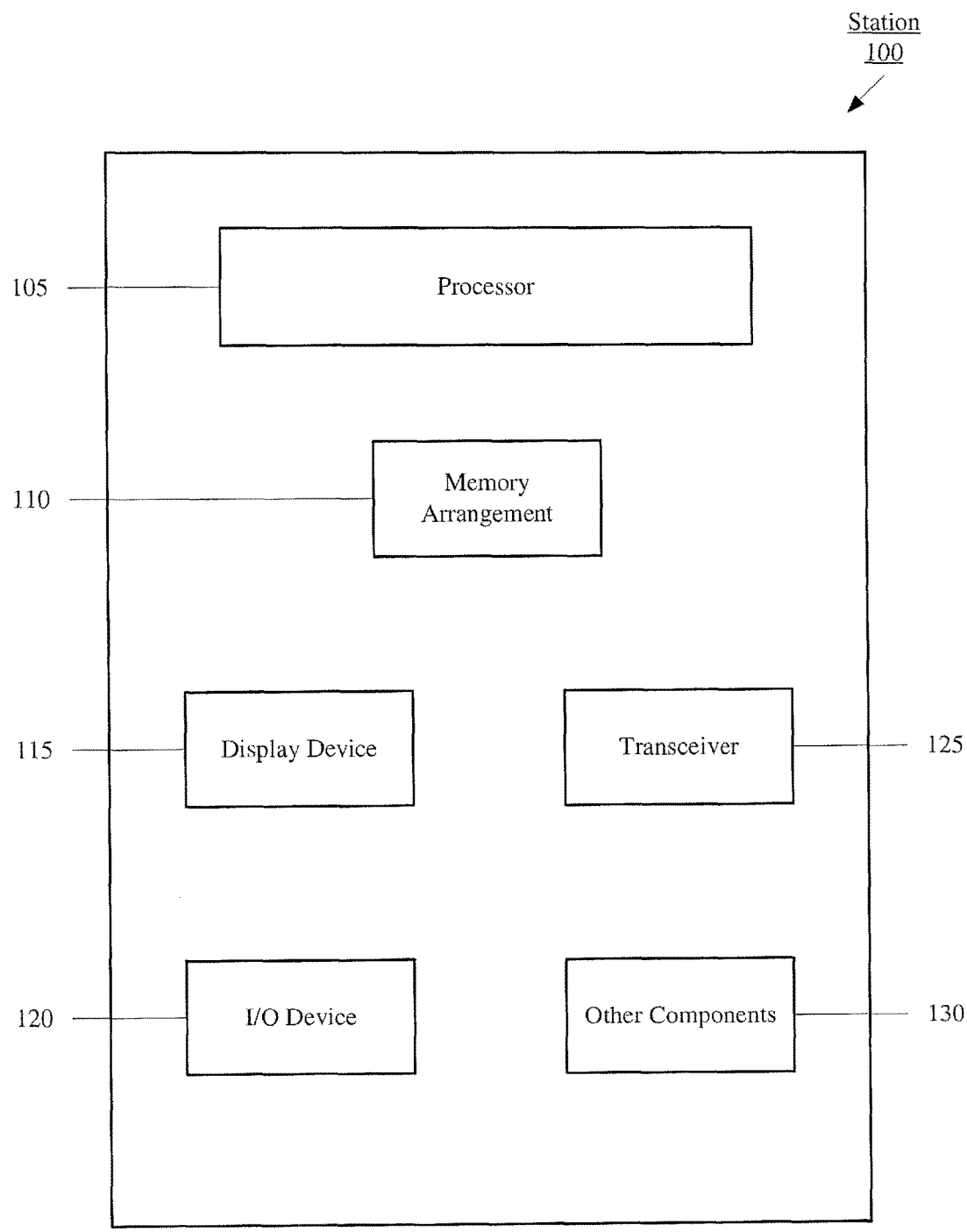
FIG. 1 shows an exemplary station determining when a scheduling request is to be transmitted.

The exemplary embodiments may be further understood with reference to the following description and the related appended drawings, wherein like elements are provided with the same reference numerals. The exemplary embodiments are related to a system and method for determining when a scheduling request (SR) is to be transmitted so that a data transmission such as voice data in a Voice-over-Long Term Evolution (VoLTE) may be transmitted. In a Long Term Evolution (LTE) network, a station connected to an LTE network may utilize a connected discontinuous reception (C-DRX) to conserve power by using an active mode of processing only during an onDuration of the C-DRX. As the SR is used in a dynamic manner and transmitted whenever a data transmission is prepared, the active mode of processing may be required during a time when a sleep mode of processing is used for the C-DRX. By coordinating the manner in which the SR is transmitted and the onDuration is required, power may further be conserved by selectively preventing the transmission of the SR despite the data transmission being prepared. The SR, the data transmission, the C-DRX, the active and sleep mode of processing, the onDuration, and a related method will be described in further detail below.

A station may establish a connection to a wireless communications network via a base station (e.g., an eNodeB (hereinafter "eNB") in LTE networks). To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. Therefore, control channel information such as physical downlink control channel (PDCCH) information, reference symbols, etc. may be received in a background operation during connection the LTE network.

A station connected to the LTE network may utilize a predetermined manner of receiving the control channel information. For example, the C-DRX cycle may be used. The C-DRX relates to utilizing the active mode of processing and the sleep mode of processing in order to conserve power. The C-DRX may include a specification or schedule in which the control channel information is received. Therefore, the station uses the active mode of processing only when the control channel information is to be received. The time at which the control channel information is received may be termed the onDuration for the C-DRX cycle. The onDuration relates to a number of frames over which the station reads downlink control channel information every C-DRX cycle before entering the sleep mode. Thus, at all other times during the C-DRX cycle, the station may utilize the sleep mode. The C-DRX cycle may have a predetermined duration N such as 40 milliseconds (ms), 20 ms, etc. For example, at a time 0, there may be an onDuration for the control channel information to be received in which the active mode is used; subsequently, upon the onDuration lapsing, the sleep mode is used; then at a time N, there may be another onDuration; subsequently, the sleep mode is again used until a time 2N; etc. It should be noted that the sleep power mode does not necessarily mean placing the processor of the station to sleep, hibernate, or deactivate. For example, the processor may continue to execute other applications or processes. The sleep power mode relates to conserving power by discontinuing a continuous processing relating to receiving transmissions from the network and calculating the wireless properties of the station.

The station connected to the LTE network may also execute applications in which a data transmission is required to be scheduled prior to actually transmitting it. The station may transmit a SR to the eNB to schedule the data transmission. The SR relates to a request for the data transmission to be transmitted. Upon receiving the SR, the eNB may generate the control channel information to be transmitted to the station in which this control channel information may include an indication of whether the data transmission is allocated an uplink grant. The SR may also utilize a specification or schedule that is known to occur at fixed intervals M. For example, the intervals M may be every 10 ms. Therefore, at every interval M, the station has an opportunity to transmit the SR when the data transmission is prepared. The interval M for SR opportunities may be more frequent than the cycle duration N of the C-DRX for a variety of reasons. For example, data traffic and voice data may be used in an application being executed by the station. In another example, a lower value for the interval M corresponds to the station being able to request resources for uplink transmission faster such as in a case voice and/or data packets from upper layers are received in a duration where uplink resources are not assigned or granted. This dynamic transmission of the SR may be used, for example, in some network deployments of VoLTE enabled at the LTE radio access network (RAN) level.

The impact of using a dynamic manner of transmitting the SR whenever a data transmission is prepared is that the station is transmitting the SR in an immediately available SR opportunity. As the interval M for the SR opportunities may be more frequent than the duration N of the C-DRX cycle, there is a high likelihood that the active mode is required in order to transmit the SR when the sleep mode would otherwise be used for the C-DRX cycle as per the specification. Therefore, the active mode may be required during an intermediary duration of the C-DRX cycle. The exemplary system and method provide a manner in which the onDuration of the C-DRX cycle and the transmission of the SR are coordinated by selectively preventing the transmission of the SR until an opportunity nearest to or on a full onDuration. Specifically, the selective preventing may be used such that the timeline associated with the selected opportunity of a SR transmission and subsequent uplink grant allocation overlaps maximally with the onDuration of the C-DRX cycle.

FIG. 1 shows an exemplary station 100 determining when a SR is to be transmitted. Specifically, the station 100 may exchange data with a base station of a wireless network, receive control channel information therefrom, and transmit a SR thereto. The station 100 may represent any electronic device that is configured to perform wireless functionalities. For example, the station 100 may be a portable device such as a phone, a smartphone, a tablet, a phablet, a laptop, etc. In another example, the station 100 may be a stationary device such as a desktop terminal. The station 100 may include a processor 105, a memory arrangement 110, a display device 115, an input/output (I/O) device 120, a transceiver 125, and other components 130. The other components 130 may include, for example, an audio input device, an audio output device, a battery, a data acquisition device, ports to electrically connect the station 100 to other electronic devices, etc.

The processor 105 may be configured to execute a plurality of applications of the station 100. For example, the applications may include a web browser when connected to a communication network via the transceiver 125. In another example, the applications may include a VoLTE application such that a talk spurt from a user of the station 100 is converted into a voice transmission. This voice transmission may require the SR transmission to be sent to the eNB prior to the actual transmission of the voice packets. The processor 105 may also execute a scheduling application that determines the SR opportunity in which the SR is to be transmitted such that the uplink timeline associated with the SR overlaps with the onDuration of the C-DRX cycle maximally. The scheduling application may be executed in a background relative to the user and may also be automatically executed upon a connection with the network, particularly when the VoLTE application is executed. The memory arrangement 110 may be a hardware component configured to store data related to operations performed by the station 100. Specifically, the memory arrangement 110 may store the voice transmission, the control channel information, and the specification for the C-DRX and the SR opportunities. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

It should be noted that the exemplary scheduling application does not need to be executed by the processor 105. In another example, the functionality that is described herein for the scheduling application may be performed by the transceiver 125 executing firmware stored on an integrated circuit of the transceiver 125. In a further example, the functionality of the scheduling application may be performed by a separate integrated circuit with or without firmware.

The transceiver 125 may be a hardware component configured to transmit and/or receive data. The transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used for transmissions that are received from the base station (e.g., eNB) and sent to the base station. In a first example, the control channel information may be received from the eNB via the transceiver 105 during the onDuration as indicated by the C-DRX cycle. In a second example, the SR may be transmitted to the eNB via the transceiver 105 at a determined SR opportunity as determined by the scheduling application. In a third example, the voice transmission may be transmitted to a server of the LTE network via the eNB at the allocated time indicated by an uplink grant included in the control channel information.

Figure 2A:
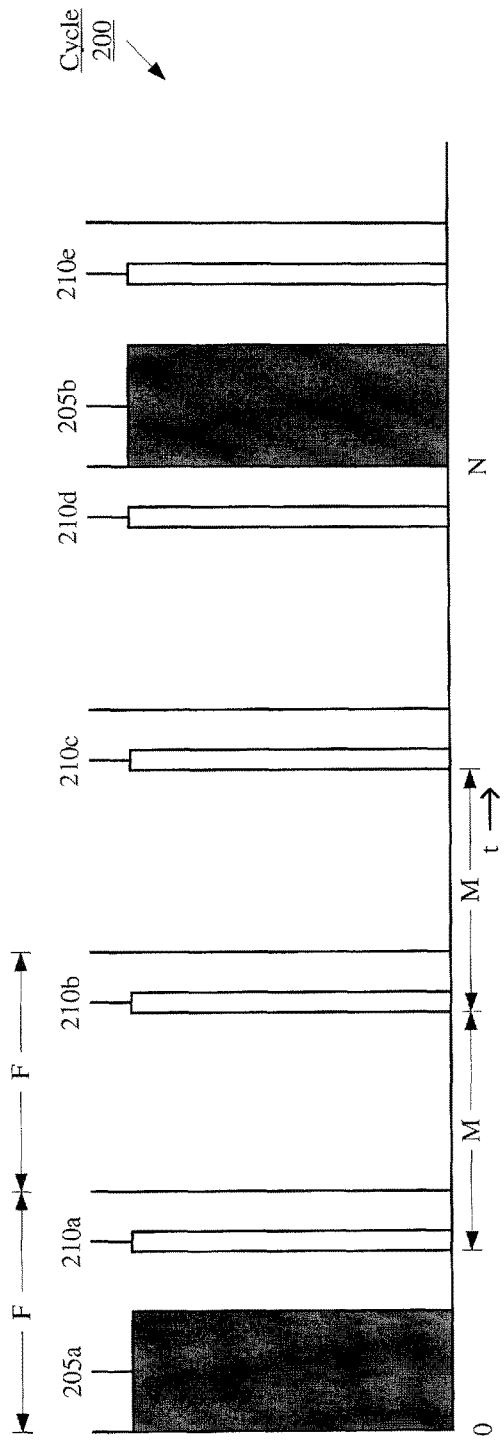
FIGS. 2A-B show first and second exemplary cycles for a C-DRX schedule and a scheduling request schedule.

FIG. 2A shows a first exemplary cycle 200 for a C-DRX schedule and a SR schedule. The first exemplary cycle 200 shows a combined schedule for the C-DRX cycle and the SR opportunities. Specifically, five complete frames are shown in the first exemplary cycle 200 in which each frame may have a duration of, for example, 10 ms. The duration of the first two frames are labeled as F in FIG. 2A. As shown, the onDurations 205a, 205b are included and separated by the interval N. Specifically, the beginning of the onDuration 205a occurs at a time 0 whereas the beginning of the onDuration 205b occurs at a time N. In one example, the time N may be 40 ms, meaning that the C-DRX cycle may be 40 ms (from the beginning of the onDuration 205a to the beginning of the next onDuration 205b). The SR opportunities 210a-e may also be included in the first exemplary cycle 200, each SR opportunity 210a-e being separated by an interval M from adjacent SR opportunities as shown by the intervals M between SR opportunity 210a and 210b and between SR opportunity 210b and 210c. If it were considered that the interval M is 10 ms, each frame may include one SR opportunity. Also as shown, the SR opportunities 210a-e may be scheduled at a time separate from the onDuration 205a-b, specifically, closer to an end of the frame duration.

Figure 2B:
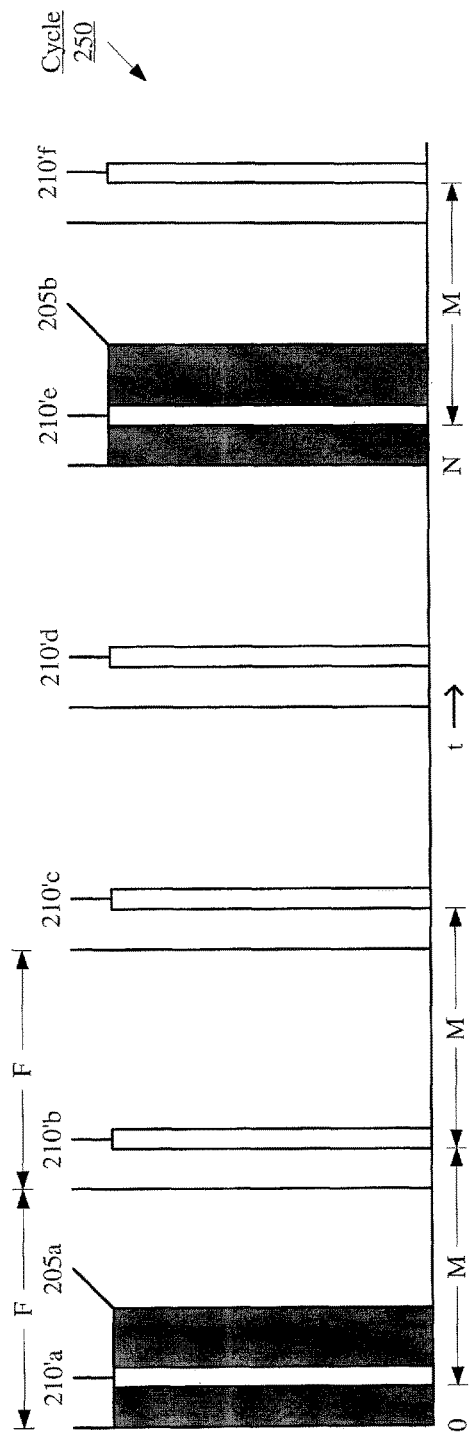

FIG. 2B shows a second exemplary cycle 250 for a C-DRX schedule and a SR schedule. The second exemplary cycle 250 also shows a combined schedule for the C-DRX cycle and the SR opportunities. Specifically, five complete frames and one incomplete frame are shown in the second exemplary cycle 250 in which each frame may have a duration of, for example, 10 ms. As shown, the onDuration 205a, 205b are included and separated by the interval N in a substantially similar manner as the first exemplary cycle 200. The SR opportunities 210'a-e may also be included in the second exemplary cycle 250 in a substantially similar manner as the first exemplary cycle 200. However, the SR opportunities 210'a-e may be scheduled at a time common with the onDuration 205a-b. Thus, during the frames including the onDurations 205a-b, the SR opportunity 210'a and 210'e, respectively, may be included. The incomplete sixth frame is also shown to include the SR opportunity 210'f (separated from the previous SR opportunity 210'e by the interval M).

Figure 3A:
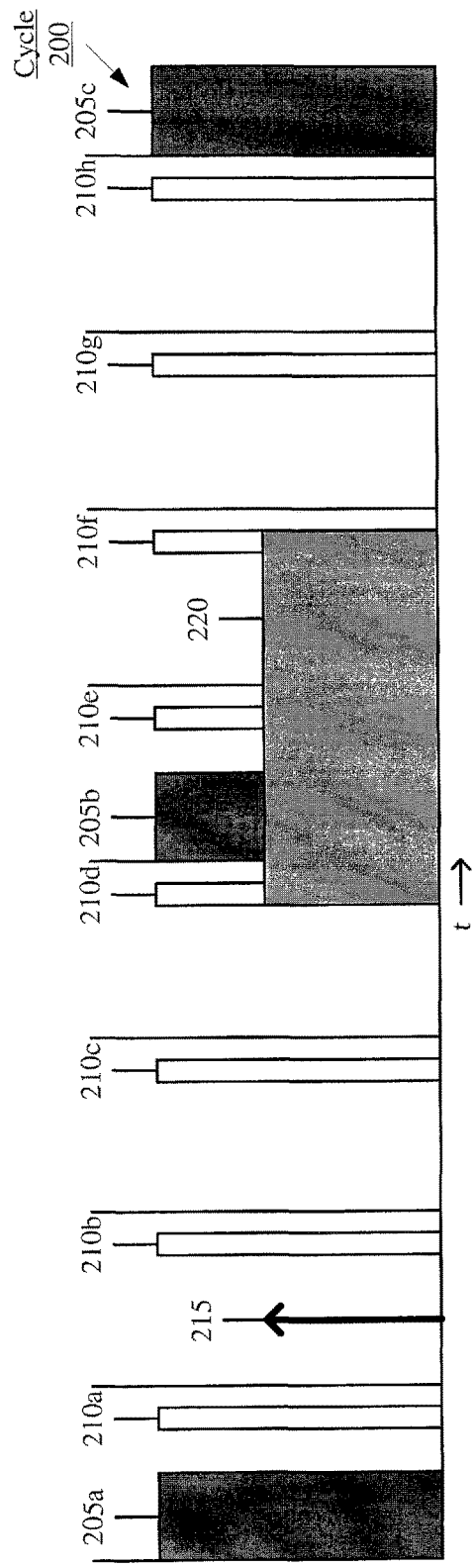
FIGS. 3A-B show first and second exemplary manners of determining when a scheduling request is to be transmitted using the first exemplary cycle of FIG. 2A.

FIG. 3A shows a first exemplary manner of determining when a SR is to be transmitted using the first exemplary cycle 200 of FIG. 2A. The first exemplary manner shown in FIG. 3A shows an extended first exemplary cycle 200 including onDurations 205a-c and SR opportunities 210a-h. FIG. 3A also shows a packet arrival time 215, e.g., when the station has a packet that is ready for an uplink transmission to the network. Specifically, the packet arrival time 215 is shown to occur in the second frame, between the SR opportunities 210a-b. According to the exemplary embodiments, to minimize a power consumption of the station, a known uplink timeline duration 220 may provide a basis in which to determine the SR opportunity to be used and selectively prevent the SR from being transmitted in the next available SR opportunity. The known uplink timeline duration 220 indicates an amount of time that the station will need to be in the active processing mode to accomplish the uplink transmission of the packet that is to be transmitted. This uplink transmission time duration may include, for example, the time to transmit the SR to the eNB, the time to receive the scheduled uplink subframe from the eNB, the time to transmit the packet in the schedule subframe, the time to receive an acknowledgement from the eNB that the packet was received, etc. The above listing of various times for actions that may be included in the known uplink timeline duration 220 is only exemplary and other actions may also be included or some of the listed actions may not be included. The point of the known uplink time duration 220 is that the scheduling application knows the duration of the actions required to successfully transmit the packet from the station to the network. As will be described in greater detail below, the scheduling application will use this known uplink time duration 220 to effectively schedule transmissions for the station.

The scheduling application may use the uplink timeline duration 220 to determine that the optimal SR opportunity in this scenario is the SR opportunity 210d. In this manner, the uplink timeline duration 220 completely overlaps the onDuration 205b. Therefore, the SR opportunities 210b-c are selectively prevented from being used to transmit the SR. In this manner, the station may use the active mode for the onDuration 205a; use the sleep mode from the end of the onDuration 205a; receive the packet arrival time 215; use the uplink timeline duration 220 to determine that the SR opportunity 210d is optimal; remain in the sleep mode until the SR opportunity 210d, bypassing the SR opportunities 210b-c; use the active mode from the beginning of the SR opportunity 210d to transmit the SR as well as receive the control channel information during the onDuration 205b; and use the sleep mode once the SR is completely transmitted (the uplink timeline duration 220 lapses). Accordingly, the normal operation of using the SR opportunity 210b is prevented and the sleep mode may be used for a longer duration.

Figure 3B:
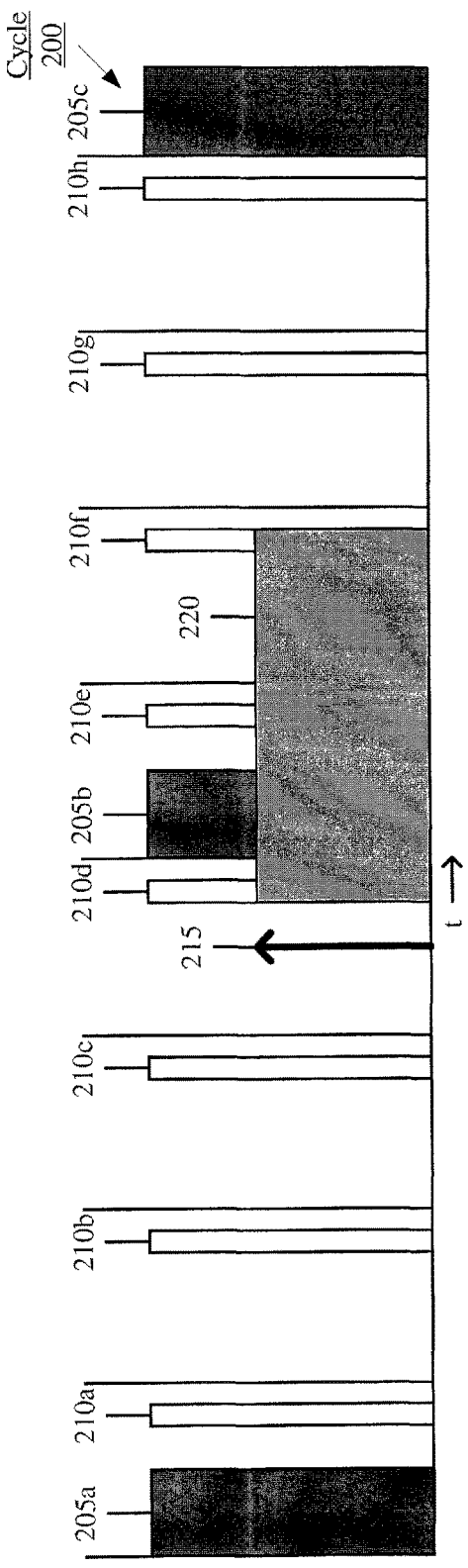

FIG. 3B shows a second exemplary manner of determining when a SR is to be transmitted using the first exemplary cycle 200 of FIG. 2A. The second exemplary manner shown in FIG. 3B also shows the extended first exemplary cycle 200 including the onDurations 205a-c and the SR opportunities 210a-h. FIG. 3B also shows a packet arrival time 215. However, the packet arrival time of the second exemplary manner occurs in the fourth frame, between the SR opportunities 210c-d. According to the exemplary embodiments, the known uplink timeline duration 220 is again used. The scheduling application may use the uplink timeline duration 220 to determine that the optimal SR opportunity in this scenario is the SR opportunity 210d. In this manner, the uplink timeline duration 220 completely overlaps the onDuration 205b. In this manner, the station may use the active mode for the onDuration 205a; use the sleep mode from the end of the onDuration 205a; receive the packet arrival time 215; use the uplink timeline duration 220 to determine that the SR opportunity 210d is optimal; remain in the sleep mode until the SR opportunity 210d; use the active mode from the beginning of the SR opportunity 210d to transmit the SR as well as receive the control channel information during the onDuration 205b; and use the sleep mode once the SR is completely transmitted (the uplink timeline duration 220 lapses).

Figure 4A:
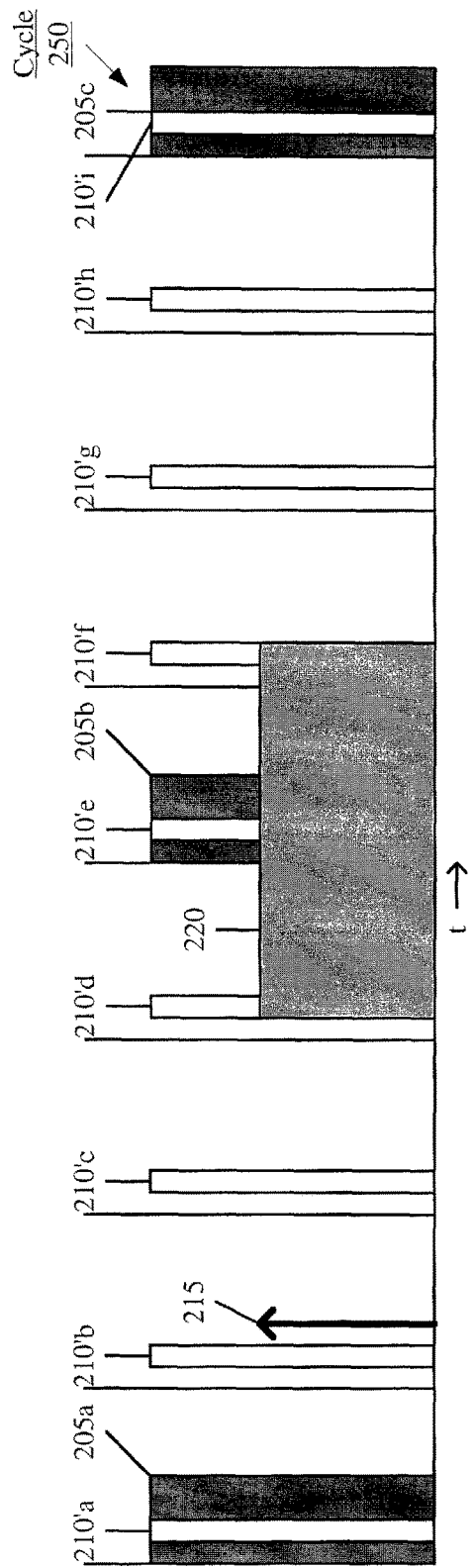
FIGS. 4A-B show first and second exemplary manners of determining when a scheduling request is to be transmitted using the second exemplary cycle of FIG. 2B.

FIG. 4A shows a first exemplary manner of determining when a SR is to be transmitted using the second exemplary cycle 250 of FIG. 2B. The first exemplary manner shown in FIG. 4A shows an extended second exemplary cycle 250 including onDurations 205a-c and SR opportunities 210'a-i. FIG. 4A also shows a packet arrival time 215. Specifically, the packet arrival time 215 is shown to occur in the second frame, between the SR opportunities 210'b-c. The packet arrival time 215 of FIG. 4A may be substantially similar to the packet arrival time 215 of FIG. 3A. However, since the SR opportunities 210'a-I are scheduled in a different manner, the packet arrival time 215 of FIG. 4A may be between the SR opportunities 210'b-c (rather than the SR opportunities 210a-b of FIG. 3A). According to the exemplary embodiments, to minimize a power consumption, the known uplink timeline duration 220 may provide the basis in which to determine the SR opportunity to be used and selectively prevent the SR from being transmitted in the known manner of using the first available SR opportunity. The scheduling application may use the uplink timeline duration 220 to determine that the optimal SR opportunity in this scenario is the SR opportunity 210'd. In this manner, the uplink timeline duration 220 completely overlaps the onDuration 205b. Therefore, the SR opportunity 210'b is selectively prevented from being used to transmit the SR. In this manner, the station may use the active mode for the onDuration 205a; use the sleep mode from the end of the onDuration 205a; receive the packet arrival time 215; use the uplink timeline duration 220 to determine that the SR opportunity 210'd is optimal; remain in the sleep mode until the SR opportunity 210'd, bypassing the SR opportunity 210'c; use the active mode from the beginning of the SR opportunity 210'd to transmit the SR as well as receive the control channel information during the onDuration 205b; and use the sleep mode once the SR is completely transmitted (the uplink timeline duration 220 lapses). Accordingly, the normal operation of using the SR opportunity 210'c is prevented and the sleep mode may be used for a longer duration.

Figure 4B:
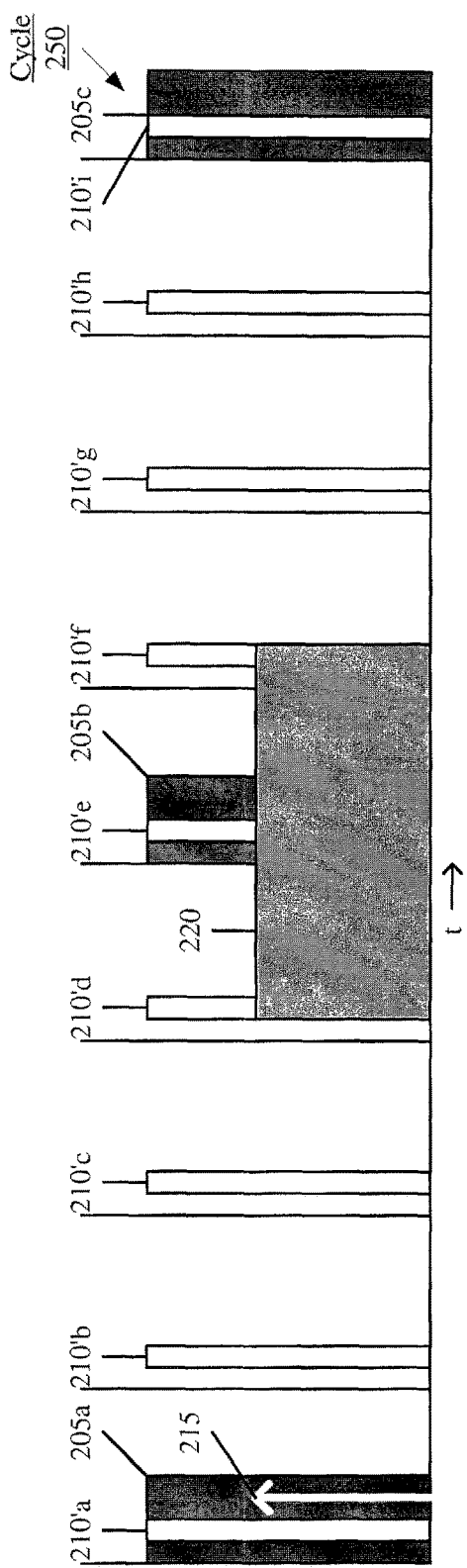

FIG. 4B shows a second exemplary manner of determining when a SR is to be transmitted using the second exemplary cycle 250 of FIG. 2B. The second exemplary manner shown in FIG. 4B also shows the extended second exemplary cycle 250 including onDurations 205a-c and SR opportunities 210'a-i. FIG. 4B also shows a packet arrival time 215. Specifically, the packet arrival time 215 is shown to occur in the first frame, between the SR opportunities 210'a-b and within the duration of the onDuration 205a. According to the exemplary embodiments, to minimize a power consumption, the known uplink timeline duration 220 may provide the basis in which to determine the SR opportunity to be used and selectively prevent the SR from being transmitted in the known manner of using the first available SR opportunity. The scheduling application may use the uplink timeline duration 220 to determine that the optimal SR opportunity in this scenario is the SR opportunity 210'd. Although the packet arrival time 215 is within the onDuration 205a, since a complete onDuration is required, the next available onDuration 205b is determined to be used by the scheduling application. In this manner, the uplink timeline duration 220 completely overlaps the onDuration 205b. Therefore, the SR opportunities 210'b-c are selectively prevented from being used to transmit the SR. In this manner, the station may use the active mode for the onDuration 205a; receive the packet arrival time 215; use the sleep mode from the end of the onDuration 205a; use the uplink timeline duration 220 to determine that the SR opportunity 210'd is optimal; remain in the sleep mode until the SR opportunity 210'd, bypassing the SR opportunities 210'b-c; use the active mode from the beginning of the SR opportunity 210'd to transmit the SR as well as receive the control channel information during the onDuration 205b; and use the sleep mode once the SR is completely transmitted (the uplink timeline duration 220 lapses). Accordingly, the normal operation of using the SR opportunities 210'b-c is prevented and the sleep mode may be used for a longer duration.

It should be noted that the uplink timeline duration 220 completely overlapping with the onDuration 205b discussed above in FIGS. 3A-B and FIGS. 4A-B is only exemplary. The uplink timeline duration 220 may have a different duration in which use of a SR may result in only a partial overlap with the onDuration. In such a scenario, the scheduling application may determine the SR that results in a greatest overlap or maximal overlap with the onDuration such that a maximum power may be conserved.

Figure 5:
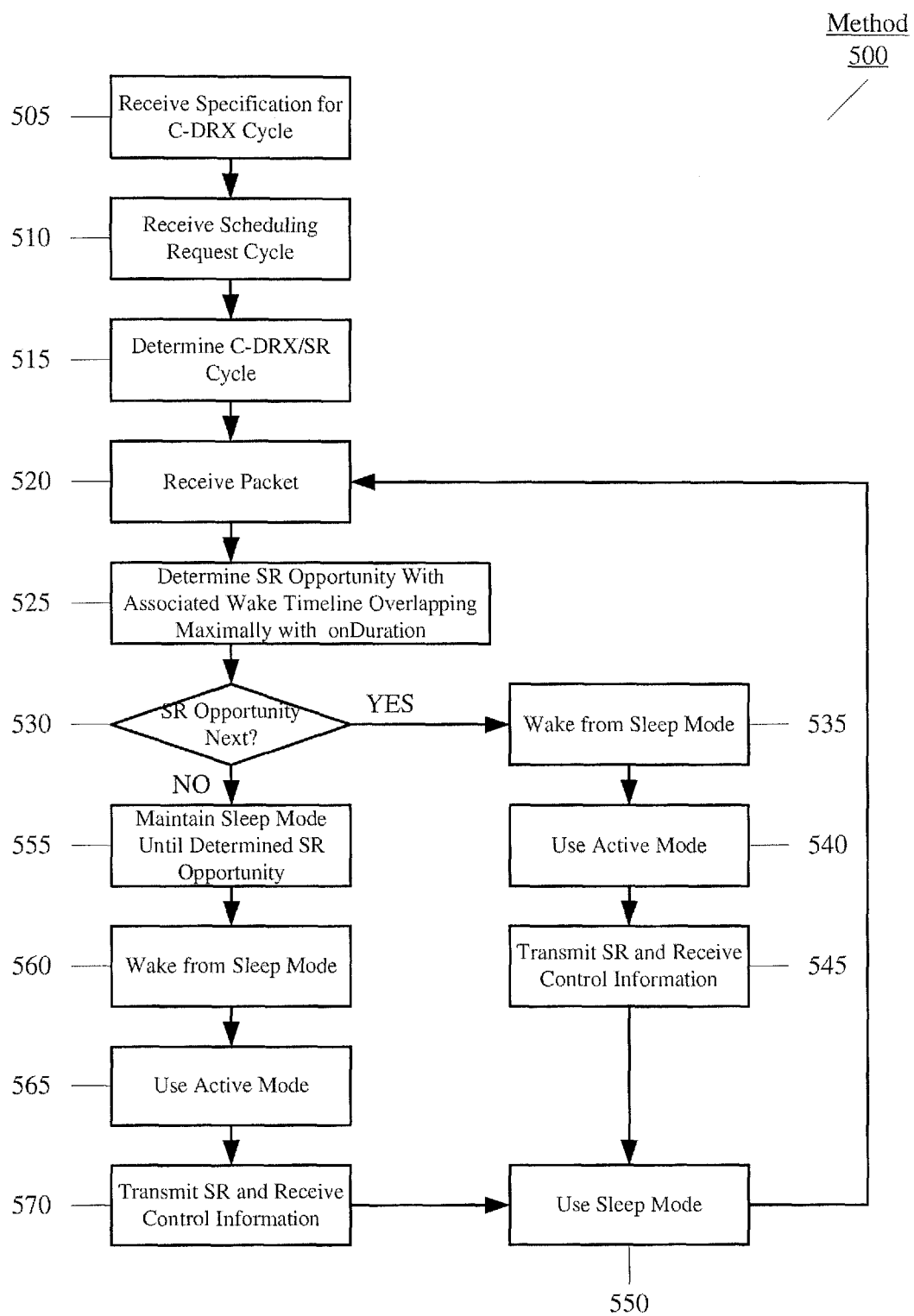
FIG. 5 shows an exemplary method for determining when a scheduling request is to be transmitted.

FIG. 5 shows an exemplary method 500 for determining when a SR is to be transmitted. The method 500 relates to the scheduling application executed by the processor 105 of the station 100 to determine the optimal SR opportunity in which to transmit the SR such that an uplink timeline duration overlaps a complete onDuration of the C-DRX cycle in a maximal manner. The method 500 will be described with regard to the station 100 of FIG. 1, the cycles 200, 250 of FIGS. 2A-B, and the exemplary manners of FIGS. 3A-B and FIGS. 4A-B.

In step 505, the scheduling application receives the specification for the C-DRX cycle. As discussed above, the specification for the C-DRX cycle may indicate a time interval M for the C-DRX cycle. In step 510, the scheduling application receives the specification for the SR opportunities. As discussed above, the specification for the SR opportunities may indicate a time interval N between each SR opportunity. In step 515, the scheduling application determines a combined schedule or cycle including the C-DRX cycle and the SR opportunities. For example, the first exemplary cycle 200 may result in which onDurations 205a-b are scheduled as well as SR opportunities 210a-e are scheduled in a known manner. In another example, the second exemplary cycle 250 may result in which the onDurations 205a-b are scheduled as well as SR opportunities 210'a-f are scheduled in a known manner.

In step 520, the scheduling application may receive the packet arrival time 215. The packet arrival time 215 may occur at any time. For example, as shown in FIG. 3A, the packet arrival time may be between SR opportunities 210a-b; as shown in FIG. 3B, the packet arrival time may be between SR opportunities 210c-d; as shown in FIG. 4A, the packet arrival time may be between SR opportunities 210'b-c; and as shown in FIG. 4B, the packet arrival time may be between SR opportunities 210'a-b.

In step 525, the scheduling application determines a SR opportunity whose associated active timeline (e.g., wake timeline) overlaps maximally with an onDuration. In each example of FIGS. 3A-B and FIGS. 4A-B, the onDuration may be the onDuration 205b based upon the packet arrival time 215. In step 530, the scheduling application determines if this SR opportunity is an immediately following SR opportunity.

If the determined SR opportunity is an immediately following SR opportunity, the method 500 continues to step 535. For example, as shown in FIG. 3B, the packet arrival time 215 precedes SR opportunity 210d which is the SR opportunity preceding the next full onDuration 205b. Therefore, in step 535, the sleep mode is terminated and, in step 540, the active mode is activated. Specifically, at the beginning of the SR opportunity 210d of FIG. 3B, the sleep mode is terminated and the active mode is activated. In step 545, the active mode is used to transmit the SR over the uplink timeline duration 220 and receive the control channel information during the onDuration 205b. Once these transmissions are completed, in step 550, the sleep mode is again used. The method 500 returns to step 520 until another packet is received.

Returning to step 530, if the determined SR opportunity is not an immediately following SR opportunity, the method 500 continues to step 555. For example, as shown in FIG. 3A and FIGS. 4A-B, the packet arrival time 215 includes more than one SR opportunity preceding the onDuration 205b. In step 555, the scheduling application indicates that the sleep mode is to be maintained until the determined earliest SR opportunity whose associated active timeline overlaps maximally with the onDuration 205b. For example, the determined SR opportunity may be 210d in FIG. 3A, 210'd in FIG. 4A, and 210'd in FIG. 4B. Therefore, in step 560, the sleep mode is terminated and, in step 565, the active mode is activated. In step 570, the active mode is used to transmit the SR over the uplink timeline duration 220 and receive the control channel information during the onDuration 205b. Once these transmissions are completed, in step 550, the sleep mode is again used. The method 500 returns to step 520 until another packet is received.

It should be noted that there may be multiple SR opportunities that overlap maximally with an onDuration. That is, with a given uplink timeline duration, use of a first SR opportunity may entirely overlap with an ensuing onDuration while use of a second SR opportunity (an immediately following SR opportunity relative to the first SR opportunity) may also entirely overlap with an ensuing onDuration. When such a scenario occurs, the earliest SR opportunity to transmit the SR may be used. The same may apply when the use of the multiple SR's may result in an equal partial overlap between the uplink timeline duration and the onDuration.

It should also be noted that the above description relating primarily to voice data in VoLTE is only exemplary. Those skilled in the art will understand that the selective prevention of SR transmission may also be applied to non-voice data traffic when a time sensitive characteristic allows for a buffering until the determined onDuration of the C-DRX cycle. This may be achieved, for example, by having an additional primitive between the radio link control (RLC) and media access control (MAC) indicating to the MAC whether it should prevent the SR from being sent until the next onDuration of the C-DRX cycle or not for the data.

The exemplary embodiments provide a system and method of selectively preventing a SR from being transmitted such that an uplink timeline duration related to transmitting the SR overlapping an onDuration of a C-DRX cycle is maximized. Upon receiving a packet arrival time and using a known value of the uplink timeline duration, an SR opportunity in a combined schedule with the C-DRX and its onDurations may be determined such that the overlap may be maximized. Therefore, when two or more SR opportunities are present between the packet arrival time and the beginning of a full onDuration, one or more of these SR opportunities may be selectively prevented from being used to transmit the SR. In this manner, a sleep mode may be maximized to conserve additional power and an active mode may be used to perform the SR transmission as well as receiving the control channel information in a single active mode session.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
  at a station:
    receiving a packet at a packet arrival time relative to a schedule indicating scheduling request (SR) opportunities and onDurations of a connected discontinuous reception (C-DRX) specification, the SR opportunities having a first interval of M milliseconds (ms) therebetween, the onDurations having a second interval of N ms therebetween, the first interval M being less than the second interval N, the SR opportunities indicating when the station may transmit an SR to a connected network, the onDurations indicating when control channel information is to be received from the connected network;
    determining a selected SR opportunity subsequent to the packet arrival time based on the SR opportunity preceding an entirety of a selected onDuration, the selected SR opportunity being selected further based on a transmission duration to transmit the SR and the packet overlapping with the entirety of the selected onDuration;

utilizing a sleep mode until a time associated with the selected SR opportunity as indicated by the schedule, the sleep mode being used to prevent at least one SR opportunity scheduled before the selected SR opportunity and between the packet arrival time and the selected onDuration to be used to transmit the SR; and utilizing an active mode to transmit the SR during the selected SR opportunity and receive the control channel information during the selected onDuration.

2. The method of claim 1, wherein the selected SR opportunity is the SR opportunity that is immediately prior to the OnDuration that immediately follows the packet arrival time.

3. A method, comprising:
at a station:
receiving, at a first time, a packet to be transmitted by the station;
determining a schedule for the station, wherein the schedule includes:
first durations having a first interval duration between each adjacent first duration, the first durations indicating an opportunity to start a transmission process for transmitting the packet and a scheduling request to a network, wherein a processor of the station is placed in an active mode to start the transmission process, and
second durations having a second interval duration between each adjacent second duration, the second durations indicating when the processor of the station is placed in the active mode to receive transmissions from the network and the second interval duration indicating when the processor of the station is placed in a sleep mode, the first interval duration being less than the second interval duration;
selecting a first duration based on the first duration preceding an entirety of a second duration to start the transmission process for transmitting the packet and the scheduling request, the first duration being selected further based on the transmission process overlapping with the entirety of the second duration; and
starting the transmission process during the first duration.

4. The method of claim 3, wherein the selected one of the first durations is a first duration immediately prior to one of the second durations that immediately follows the first time.

5. The method of claim 3, wherein the second duration is an OnDuration of a connected discontinuous reception (C-DRX) cycle.

6. The method of claim 3, wherein the first duration is a scheduling request (SR) opportunity, wherein the station transmits a SR to the network.

7. The method of claim 3, further comprising:
starting the transmission process at the selected one of the first durations, wherein the starting of the transmission process includes transmitting a scheduling request (SR) to the network; and
performing the transmission process.

8. The method of claim 7, further comprising:
placing the processor of the station into the sleep mode after the transmission process is complete.

9. The method of claim 3, wherein the network is an LTE network including an evolved Node B (eNB), the transmissions received from the network during the second durations including physical downlink control channel (PDCCH) transmissions from the eNB.

10. The method of claim 3, wherein the packet is a voice packet generated by a Voice over LTE (VoLTE) application of the station.

11. The method of claim 3, wherein the first duration is not a first duration immediately following the first time and the processor of the station remains in the sleep mode during the first duration immediately following the first time.

12. A station, comprising:
a transceiver configured to establish a connection to a network; and
a processor coupled to a memory, wherein the processor is configured to:
receive, at a first time, a packet to be transmitted by the station;
determine a schedule for the station, wherein the schedule includes:
first durations having a first interval duration between each adjacent first duration, the first durations indicating an opportunity to start a transmission process for transmitting the packet and a scheduling request to the network, wherein the processor of the station is placed in an active mode to start the transmission process, and
second durations having a second interval duration between each adjacent second duration, the second durations indicating when the processor of the station is placed in the active mode to receive transmissions from the network and the second interval duration indicating when the processor of the station is placed in a sleep mode, the first interval duration being less than the second interval duration;
select a first duration based on the first duration preceding an entirety of a second duration to start the transmission process for transmitting the packet and the scheduling request, the first duration being selected further based on the transmission process overlapping with the entirety of the second duration; and
starting the transmission process during the first duration.

13. The station of claim 12, wherein the selected one of the first durations is a first duration immediately prior to one of the second durations that immediately follows the first time.

14. The station of claim 12, wherein the second duration is an OnDuration of a connected discontinuous reception (C-DRX) cycle.

15. The station of claim 12, wherein the first duration is a scheduling request (SR) opportunity, wherein the station transmits a SR to the network.

16. The station of claim 12, wherein the processor is further configured to:
start the transmission process at the selected one of the first durations, wherein the starting of the transmission process includes transmitting a scheduling request (SR) to the network; and
perform the transmission process.

17. The station of claim 16, wherein the processor is further configured to:
place the processor of the station into the sleep mode after the transmission process is complete.

18. The station of claim 12, wherein the network is an LTE network including an evolved Node B (eNB), the transmissions received from the network during the second durations including physical downlink control channel (PDCCH) transmissions from the eNB.

19. The station of claim 12, wherein the packet is a voice packet generated by a Voice over LTE (VoLTE) application of the station.

20. The station of claim 12, wherein the first duration is not a first duration immediately following the first time and the processor of the station remains in the sleep mode during the first duration immediately following the first time.

* * * * *